United States Patent
Bastide et al.

(10) Patent No.: US 10,326,724 B2
(45) Date of Patent: Jun. 18, 2019

(54) AUTOMATIC E-MAIL CONTENT TASK IDENTIFIER AND ACTION ASSISTANT

(71) Applicant: International Business Machines Corporation, Armonk, NY (US)

(72) Inventors: Paul R. Bastide, Boxford, MA (US); Shu Qiang Li, Beijing (CN); Yun Zhi Lin, Beijing (CN); Pei Sun, Beijing (CN); Zhi Yu Yue, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 211 days.

(21) Appl. No.: 15/279,620

(22) Filed: Sep. 29, 2016

(65) Prior Publication Data
US 2018/0091459 A1 Mar. 29, 2018

(51) Int. Cl.
*H04L 12/58* (2006.01)
(52) U.S. Cl.
CPC .................... *H04L 51/18* (2013.01)
(58) Field of Classification Search
CPC .......... G06F 3/04842; G06F 17/30958; G06F 17/30598; G06F 3/0482; G06N 99/005
See application file for complete search history.

(56) References Cited

U.S. PATENT DOCUMENTS

| | | | |
|---|---|---|---|
| 7,885,948 B2 | 2/2011 | Johnson et al. | |
| 8,935,190 B2 | 1/2015 | Amoroso et al. | |
| 2009/0006366 A1* | 1/2009 | Johnson | G06F 17/30707 |
| 2010/0153325 A1* | 6/2010 | Amoroso | G06Q 10/107 |
| | | | 706/46 |
| 2011/0179362 A1* | 7/2011 | Craddock | H04L 51/08 |
| | | | 715/752 |
| 2014/0280616 A1 | 9/2014 | Ramanathan et al. | |
| 2015/0256489 A1 | 9/2015 | Chen et al. | |
| 2016/0065517 A1 | 3/2016 | Beausoleil et al. | |
| 2017/0358304 A1* | 12/2017 | Castillo Sanchez | G10L 15/22 |
| 2017/0358305 A1* | 12/2017 | Kudurshian | G10L 15/22 |

OTHER PUBLICATIONS

"SaneBox for Business", SaneBox, © Copyright 2016 SaneBox, Inc., <https://www.sanebox.com/business>, printed May 11, 2016, 7 pages.
"Track e-mail messages that require follow up", Microsoft, <https://support.office.com/en-us/article/Track-e-mail-messages-that-require-follow-up-9d0f175f-f3e9-406d-bbf7-9c57e1f781cc>, printed May 11, 2016, 3 pages.

* cited by examiner

*Primary Examiner* — Scott B Christensen
(74) *Attorney, Agent, or Firm* — Gilbert Harmon, Jr.

(57) ABSTRACT

An approach for identifying and managing tasks in an e-mail system. An e-mail task manager, receives an e-mail and creates n-grams based on e-mail data content and metadata content. The e-mail task manager identifies the e-mail as a task e-mail based on analyzing the n-grams to detect a task and a task owner. The e-mail task manager determines task details associated with the task e-mail based on the n-grams and determines a collection of recommended actions based on the task details. The e-mail task manager stores the collection of recommended actions and associated action states in a task history store. The e-mail task manager outputs the collection of recommended actions and the action states associated with the task e-mail based on the task owner and updates the collection of recommend actions and the associated action states based on interactions by the task owner.

20 Claims, 4 Drawing Sheets

AUTOMATIC E-MAIL CONTENT TASK IDENTIFIER AND ACTION ASSISTANT

BACKGROUND OF THE INVENTION

The present invention relates generally to e-mail management productivity and more particularly, to identifying tasks and recommending task owner actions in response to the tasks.

With a proliferation of electronic communication tools that can couple with e-mail (e.g., instant messaging, social collaboration, etc.) and with a large volume of e-mail exchanges, a user can be challenged to identify tasks that need action. For example, an e-mail from a supervisor asking for status of a project can initiate the need to request information from project team members, collect data from collaboration tools to prepare a status response, schedule a meeting to present the project status and respond to the supervisor when status information can be delivered. A user can manually filter through a batch of e-mails that continue to arrive during a day however, identifying those e-mails needing attention and keeping track of which actions have been taken for each task found in some of the e-mails can overwhelm a user and negatively affect productivity. Further, incoming e-mail can quickly interrupt and/or further refine a task instruction causing the incoming e-mail to distract/inhibit a task owner from taking timely actions toward task completion.

SUMMARY

As disclosed herein, a method for identifying and managing tasks in an e-mail system, the method comprising: receiving, by an e-mail task manager, an e-mail; creating, by the e-mail task manager, n-grams based on e-mail data content and metadata content associated with the e-mail; identifying, by the e-mail task manager, the e-mail as a task e-mail based on analyzing the n-grams to detect a task and a task owner wherein the task owner is a recipient of the e-mail and is identified by the n-grams; determining, by the e-mail task manager, task details associated with the task e-mail based on the n-grams; determining, by the e-mail task manager, a collection of recommended actions based on the task details; storing, by the e-mail task manager, the collection of recommended actions and associated action states in a task history store; outputting, by the e-mail task manager, the collection of recommended actions and the action states associated with the task e-mail based on the task owner and updating, by the e-mail task manager, the collection of recommend actions and the associated action states based on interactions by the task owner. A computer system and a computer program product corresponding to the above method are also disclosed herein.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Embodiments of the present invention provide an approach to analyze e-mail using n-grams as a recipient receives and processes their mail to determine if the e-mail content comprise content indicates a task where the recipient is an owner. Embodiments can use n-grams to determine e-mail content characteristics to identify task details such as, but not limited to, who requested a task, who is the owner of the task, what the task deliverables are and when the task is due. Some embodiments can create a collection of recommended actions that the owner can take to complete a task and the recommended actions can be augmented analyzing n-grams from a history of task related e-mails, to determine specific operation of actions that can be displayed/output toward the task owner. The displayed collection of recommended actions can be ordered/sequenced based on priority and task owner interactions with recommended actions can be monitored to track states/conditions of action execution to assist the task owner in completing tasks.

N-grams, known by one skilled in the art, are the elements of a statistical language model that can identify a probability distribution over sequences of words. Given a word sequence for processing natural language, the word sequence and a combinations of portions of the word sequence can be used to estimate the relative likelihood of different phrases having contextual meaning. When using n-grams for natural language modeling in embodiments of the present invention, field-value pairs can be identified from e-mail content to determine and identify tasks articulated within the e-mail, determine recommended actions and present the recommended actions to assist a task owner with the completion of an identified task.

Embodiments of the present invention will now be described in detail with reference to the figures. It should be noted that references in the specification to "an exemplary embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure or characteristic is described in connection with an embodiment, it is submitted that it is within the knowledge of one skilled in the art to affect such feature, structure or characteristic in connection with other embodiments whether or not explicitly described.

Figure 1:
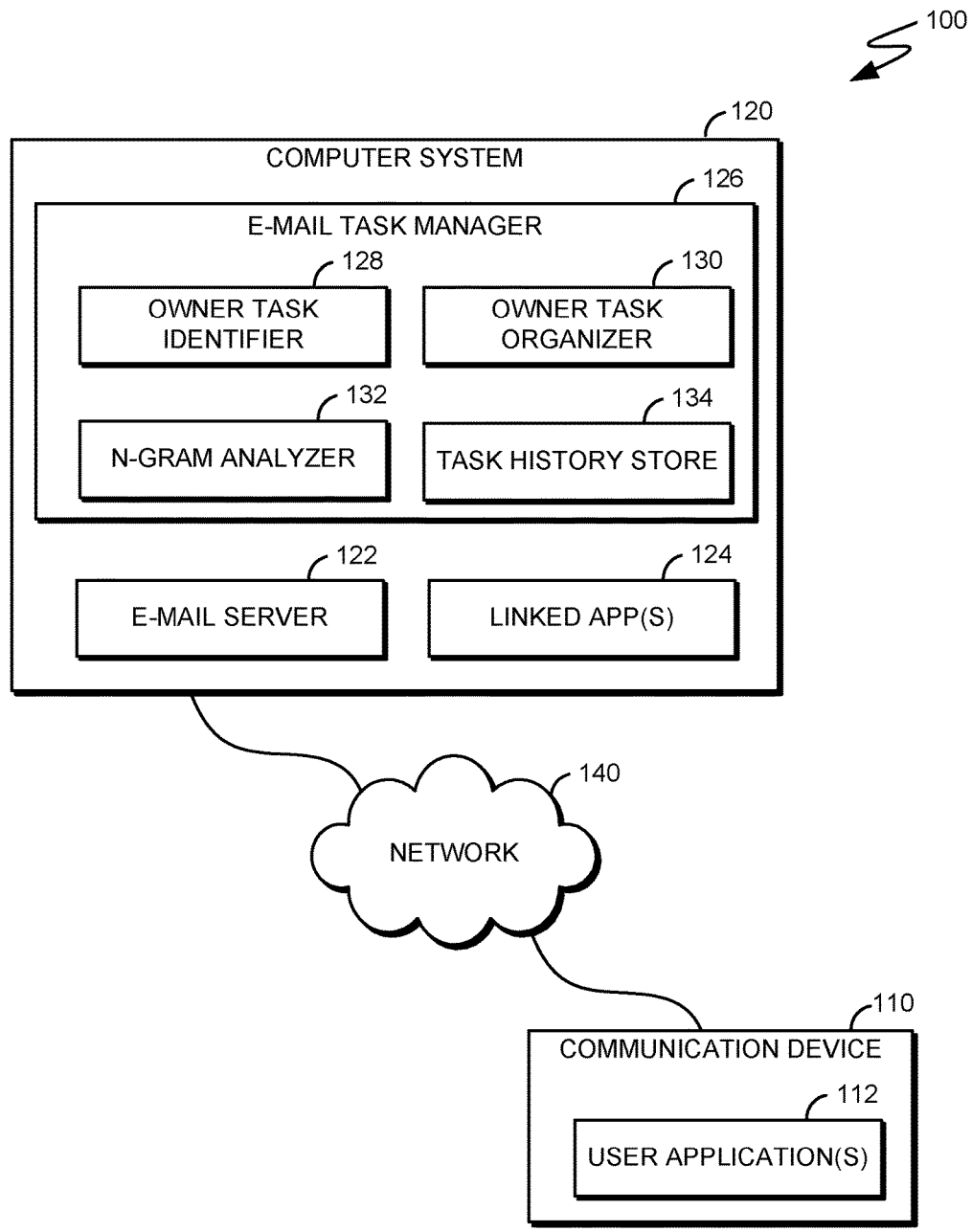
FIG. 1 illustrates a functional block diagram of a computing environment, in accordance with an embodiment of the present invention.

FIG. 1 illustrates a functional block diagram of computing environment 100, in accordance with an embodiment of the present invention. Computing environment 100 comprises COMMUNICATION DEVICE 110 and COMPUTER SYSTEM 120, interconnected via NETWORK 140. COMMUNICATION DEVICE 110 and COMPUTER SYSTEM 120 can be desktop computers, laptop computers, specialized computer servers, or the like. In certain embodiments, COMMUNICATION DEVICE 110 and COMPUTER SYSTEM 120 collectively represent computer systems utilizing clustered computers and components acting as a single pool of seamless resources via NETWORK 140. For example, such embodiments can be used in data center, cloud computing, storage area network (SAN), and network attached storage (NAS) applications. In general, COMMUNICA- TION DEVICE 110 and COMPUTER SYSTEM 120 are representative of any electronic devices, or combination of electronic devices, capable of executing computer readable program instructions, as described in detail with regard to FIG. 4.

In some embodiments, COMMUNICATION DEVICE 110 comprises USER APPLICATION(S) 112, where USER APPLICATION(S) 112 can be a plurality of USER APPLICATION(S) 112 within COMMUNICATION DEVICE 110. USER APPLICATION(S) 112 can comprise one or more e-mail clients and/or applications that can manage/operate functions of COMMUNICATION DEVICE 110 and COMPUTER SYSTEM 120, in accordance with some embodiments. It should be noted that some embodiments can operate with an e-mail client to present recommended actions and the e-mail client can perform operations such as, but not limited to, receiving, sending and managing e-mail locally within COMMUNICATION DEVICE 110 and/or within COMPUTER SYSTEM 120.

In some embodiments, NETWORK 140 can be a local area network (LAN), a wide area network (WAN) such as the Internet, or a combination of the two, and include wired, wireless, or fiber optic connections. In general, NETWORK 140 can be any combination of connections and protocols that will support communications between COMMUNICATION DEVICE 110 and COMPUTER SYSTEM 120.

In some embodiments, COMPUTER SYSTEM 120 can be a plurality of COMPUTER SYSTEMS 120. In the depicted embodiment, COMPUTER SYSTEM 120 comprises, E-MAIL SERVER 122, LINKED APP(S) 124 and E-MAIL TASK MANAGER 126.

In some embodiments, E-MAIL SERVER 122 can be a plurality of E-MAIL SERVERS 122 within COMPUTER SYSTEM 120. E-MAIL SERVER 122 can manage e-mail processing such as, but not limited to, sending and/or receiving messages using an e-mail protocol such as, but not limited to, POP3, IMAP and SMTP over NETWORK 140. E-MAIL SERVER 122 can store e-mail messages in locations such as, but not limited to, user mailboxes and inboxes. E-MAIL SERVER 122 can operate with COMMUNICATION DEVICE 110 and can comprise any combination of commercial or custom devices and/or software products associated with operating and maintaining an e-mail system. It should be noted that during operation of an e-mail client (e.g., USER APPLICATION(S) 112), e-mail can be stored locally on a user's COMMUNICATION DEVICE 110 where local copies of e-mail can be replicated between COMMUNICATION DEVICE 110 and E-MAIL SERVER 122 and in other implemenations, e-mail can be stored on E-MAIL SERVER 122 where COMMUNICATION DEVICE 110 can be a user interface with E-MAIL SERVER 122 e-mail. Embodiments of the present invention can operate with a combination of COMMUNICATION DEVICE 110 and/or E-MAIL SERVER 122 implementations.

In some embodiments, LINKED APP(S) 124 can be a plurality of LINKED APP(S) 124 within COMPUTER SYSTEM 120. LINKED APP(S) 124 can comprise applications that can be launched/executed remotely and/or locally. For example, LINKED APP(S) 124 can comprise applications such as, but not limited to, word processors, spreadsheets, database management systems/applications, social network tools, etc. Some embodiments can interact with LINKED APP(S) 124 to enable recommended action capabilities. In some embodiments, LINKED APP(S) 124 can comprise any combination of commercial or custom devices and/or software products associated with operating and managing task related actions.

In some embodiments, E-MAIL TASK MANAGER 126 can be a plurality of E-MAIL TASK MANAGERS 126 within COMPUTER SYSTEM 120 and E-MAIL TASK MANAGER 126 can be a separate and/or integrated tool that can be operated to identify task related e-mail and manage creation and output of one or more recommended actions to assist a task owner in completing identified task(s). In the depicted embodiment, E-MAIL TASK MANAGER 126 comprises, OWNER TASK IDENTIFIER 128, OWNER TASK ORGANIZER 130, N-GRAM ANALYZER 132 and TASK HISTORY STORE 134. In some embodiments, E-MAIL TASK MANAGER 126 can operate in conjunction with a combination of commercial or custom devices and/or software products associated with detecting and managing actions associated with task related e-mails.

In some embodiments, OWNER TASK IDENTIFIER 128 can be a plurality of OWNER TASK IDENTIFIERS 128 within E-MAIL TASK MANAGER 126. OWNER TASK IDENTIFIER 128 can analyze e-mails as they are received and/or interacted with (e.g., opened, edited, etc.) by a recipient to determine if an e-mail comprises a task and if the e-mail recipient is the task owner. OWNER TASK IDENTIFIER 128 can operate with N-GRAM ANALYZER 132 to analyze n-grams that represent a word and/or group of words that have a probabiltiy of comprising a task and e-mail content. The e-mail content can comprise metadata (data about data) and/or data indicated that the e-mail recipient is the owner of the task. If the e-mail recipient is the owner of the task then the e-mail can be marked as a task e-mail and E-MAIL TASK MANAGER 126 can continue to operate with the task e-mail otherwise e-mail processing by E-MAIL TASK MANAGER 126 can be bypassed. For example, 'Bob' can send an e-mail toward 'Alice' and 'Paul', requesting status of a project from 'Alice'. In this example, if 'Paul' opens his inbox, OWNER TASK IDENTIFIER 128 can determine via N-GRAM ANALYZER 132, that the e-mail from 'Bob' comprises a task (e.g., "request", "project" and "status" identified by n-grams as a task) but while 'Paul' is an e-mail recipient, 'Paul' is not addressed as the task owner (e.g., 'Bob' asked 'Alice'). In this case, E-MAIL TASK MANAGER 126 can skip further processing for 'Paul'. In the case of 'Alice' as a recipient, 'Alice' can open the e-mail from 'Bob' and OWNER TASK IDENTIFIER 128 can determine via N-GRAM ANALYZER 132, that 'Alice' is identified as task owner the e-mail is classified as a task e-mail. E-MAIL TASK MANAGER 126 can operate to further process the task e-mail to determine recommended actions for the task owner to complete the task.

In some embodiments, OWNER TASK ORGANIZER 130 can be a plurality of OWNER TASK ORGANIZERS 130 within E-MAIL TASK MANAGER 126. OWNER TASK ORGANIZER 130 can operate with N-GRAM ANALYZER 132 to identify task details and TASK HISTORY STORE 134 to identify actions that match the context of n-grams related to the task details of a task e-mail. Task details can comprise information such as, but not limited to, task requester, task owner, task deliverables (e.g., what is output is needed to complete the task) and task due date. The current content of a task e-mail thread, the prior conversation (e.g., e-mail thread) comprising the task e-mail thread and historic related n-grams from TASK HISTORY STORE 134 can be used to determine recommended actions for a task. For example, a task can be matched with predefined tasks from the history store to collect associated recommended action. Further task e-mail and TASK HISTORY STORE 134 n-gram can be used to augment recommended actions to operate specifically for a task and/or to prioritize the recommended actions. For example, 'Bob' can send an e-mail toward 'Alice' and 'Paul', requesting status of a project from 'Alice'. 'Alice' then re-sends the task e-mail toward 'Paul' to ask 'Paul' for other details related to the project. Both 'Alice' and 'Paul' can be presented with unique recommended actions as they operate their copy of the task e-mail and their related task. In this example, OWNER TASK ORGANIZER 130 can use the prior e-mail content (e.g., e-mail thread) that comprises specifics from the 'Alice' task to extract context and identify recommended actions for the task assigned to 'Paul'. In a further example, 'Alice' has prepared past project status requests and has formerly solicited information from 'Susan' and 'Fred' based on TASK HISTORY STORE 134 content. In this example, OWNER TASK ORGANIZER 130 can augment a recommended action such as, but not limited to, "send e-mail" to operate specifically as "send e-mail to 'Susan' and 'Fred'." In this recommended action augmentation example, 'Alice' can be presented with a "send e-mail to 'Susan' and 'Fred'" action by OWNER TASK ORGANIZER 130. When 'Alice' selects the action, a new e-mail can be launched with 'Susan' and 'Fred' as addresses and the e-mail can further comprise all and/or portions of the original task e-mail for 'Alice' to review and send.

Some embodiments, OWNER TASK ORGANIZER 130 can monitor task owner activation/interaction of recommended actions to mark the state of an action (e.g., action state). Action states can comprise task owner interaction status such as, but not limited to, incomplete, complete, in process, hidden, ignore, past due, due, optional, etc. Further, OWNER TASK ORGANIZER 130 can determine the sequence/order of a collection of recommended actions output when presented to the task e-mail owner. The display order/sequence of recommended actions can be based on a predetermined order and/or recommended action attributes such as, but not limited to, action state, task/action due dates and last action activated. For example, a last action activated can indicate the a task owner has selected and/or lauched an action from the recommended action bar whereas a task/action due dates can comprise a search of n-grams of a task to determine if an upcoming event is approaching and an action related to the upcoming event is a prerequesite. In the example, a meeting with a supervisor can be expected prior to meeting with a customer. A history of similar tasks (e.g., TASK HISTORY STORE 134) can indicate that a meeting request with a supervisor has occurred prior to a customer meeting and as the customer meeting action (e.g., related to the task) approaches, the supervisor meeting request task can be prioritized in the recommended action bar. To determine recommended actions comprising the collection of recommended actions, OWNER TASK ORGANIZER 130 can search defaults actions associated with task n-grams in TASK HISTORY STORE 134. Default recommended actions can be linked to task related n-grams (e.g., n-grams having "task context") in TASK HISTORY STORE 134. For example, a task indicating a "need to meet" task can be associated with a "setup meeting action". Beyond a default task/action association, OWNER TASK ORGANIZER 130 can search a history of actions for prior task associated n-grams. The prior task/action history n-grams can be analyzed by comparing task details with prior task detail to find similar occurrences that can be used to measure occurrence frequency (e.g., score) of recommended actions associated with the current task e-mail. For example, a query such as, but not limited to, "SELECT ACTION FROM NGRAM_ACTION_MAPPING WHERE NGRAM =<start>-Cat GROUP BY ACTION" can be repeated for each n-gram to group categories (e.g., 'Cat') and count an aggregate of actions (e.g., 'ACTION') to create a prioritized collection of recommended actions. For example, a query can determine from task/action history a result of "<start>Cat: SCHEDULE-MEETING" such that recommended action 'Schedule Meeting' where the result can be output as a first recommended action in the collection of recommended actions if the score is higher than other recommended actions. Further, OWNER TASK ORGANIZER 130 can filter/truncate the collection of recommended actions for reasons such as, but not limited to, simplifying the quantity of task owner interaction options and to accommodate display/output real estate limitations. It should be noted that some embodiments can provide an 'Other' or similarly named action that can comprise task owner actions such as, but not limited to, lower priority recommended actions, hidden/ignored recommended actions based on task owner selection and completed recommended actions. In some embodiments, OWNER TASK ORGANIZER 130 can dynamically display a recommended action bar/list associated with the task e-mail as the task owner opens and/or operates of the task e-mail. For example, a task owner can interact with a recommended action (e.g., displayed in a horizontal task bar above an opened task e-mail). The recommended action can launch a presentation template to create a chart deck. When the task owner saves the presentation and returns to the task e-mail, OWNER TASK ORGANIZER 130 can dynamically update the recommended action to indicate a presentation action has been performed. For example, an icon representing the presentation can be moved to a lower priority (e.g., shifted right on a horizontal collection of recommended actions) in the recommended action bar while further transforming (e.g., action augmentation) the recommended action to open the existing presentation as opposed to launching the creation of a new presentation.

In some embodiments, N-GRAM ANALYZER 132 can be a plurality of N-GRAM ANALYZERS 132 within E-MAIL TASK MANAGER 126. N-GRAM ANALYZER 132 can extract n-grams from e-mail content for identification of a task and task details used to determine a collection recommended actions for completing a task. N-GRAM ANALYZER 132 can operate with OWNER TASK IDENTIFIER 128 and OWNER TASK ORGANIZER 130 to identify n-grams from natural language text. For example, an e-mail is received by 'Alice' from 'Bob'. The e-mail content comprises "Hey Alice, Cow jumped over the moon., Thanks, Bob." Ignoring greetings and salutations for this example, N-GRAM ANALYZER 132 can extract "Cow jumped over the moon." N-gram processing can select each word in the message, while maintaining case, to split the content into an n-gram using methods such as, but not limited to, bigram (e.g., 'a-jump') and trigram (e.g., 'a-jump-over'). The n-gram can be represented as "<start>-Cow|Cow-jumped|jumped-over|over-the|the-moon|moon-<end>." In some embodiments, N-GRAM ANALYZER 132 can comprise any combination of commercial or custom devices and/or software products associated with natural language processing based on n-gram modeling techniques.

In some embodiments, TASK HISTORY STORE 134 can be a plurality of TASK HISTORY STORES 134 within E-MAIL TASK MANAGER 126. TASK HISTORY STORE 134 can be store a history/corpus (e.g., body of knowledge) of n-grams extracted from a history of task e-mails related to a task e-mail owner and can comprise associated recommended actions for task related n-grams. Further TASK HISTORY STORE 134 can comprise action states of owner interactions with the recommended actions. TASK HISTORY STORE 134 can operate with N-GRAM ANALYZER 132 and OWNER TASK ORGANIZER 130 where N-GRAM ANALYZER 132 can read/write the n-gram history/corpus to process task e-mails and OWNER TASK ORGANIZER 130 can read/write actions related to tasks, manage recommended action function and display/output a collection of recommended actions.

Figure 2:
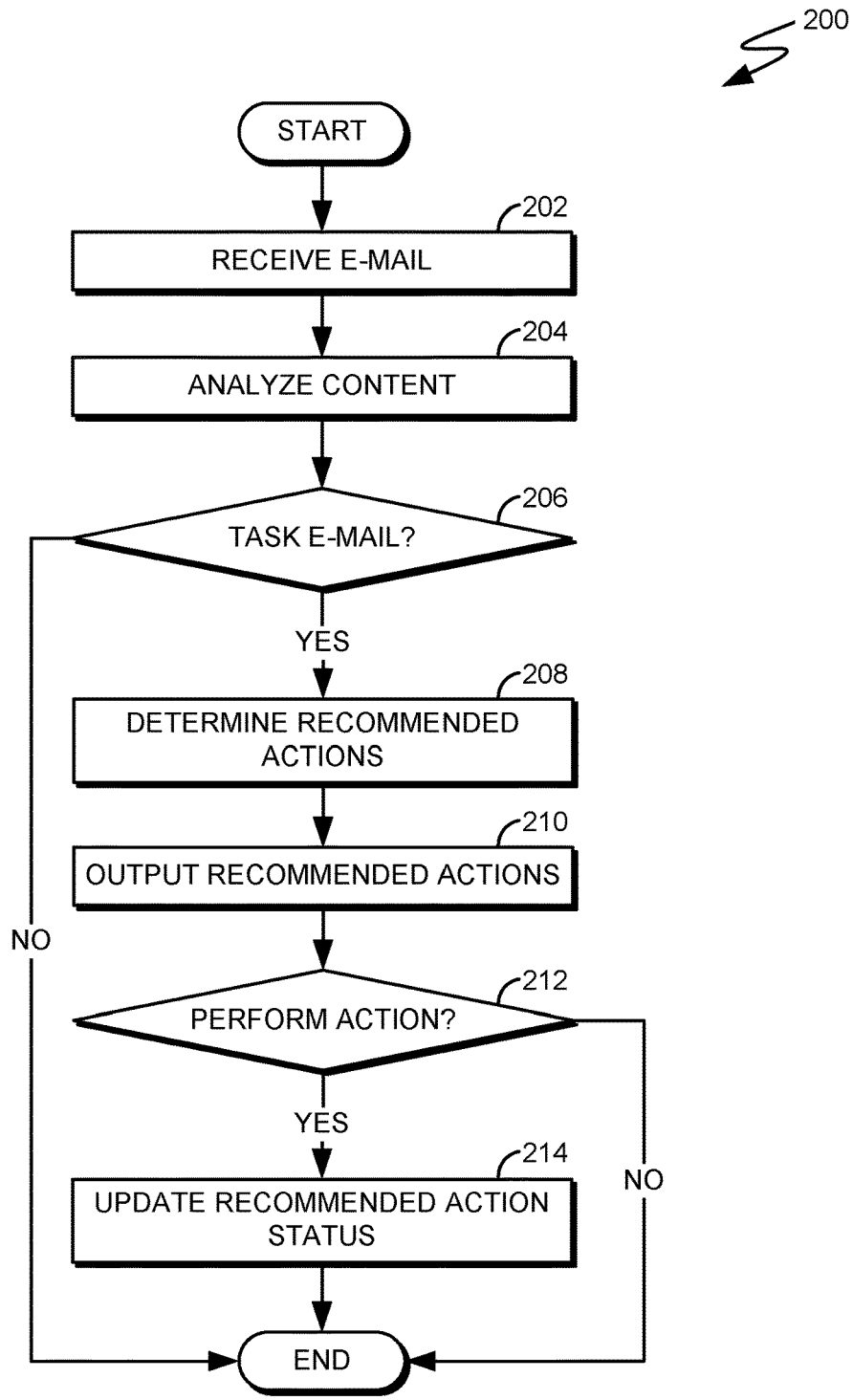
FIG. 2 illustrates a flowchart of an email task manager, in accordance with an embodiment of the present invention.

FIG. 2 illustrates a flowchart of an e-mail task manager, in accordance with an embodiment of the present invention. E-mail task manager flow 200, comprises operations RECEIVE E-MAIL 202, ANALYZE CONTENT 204, TASK E-MAIL 206, DETERMINE RECOMMENDED ACTIONS 208, OUTPUT RECOMMENDED ACTIONS 210, PERFORM ACTION 212 and UPDATE RECOMMENDED ACTION STATUS 214.

Operation RECEIVE E-MAIL 202, can be based on the receipt of an e-mail toward a recipient (e.g., new inbox e-mail) and/or a when recipient interacts with the e-mail (e.g., e-mail opened) to activate processing toward operation ANALYZE CONTENT 204.

Operation ANALYZE CONTENT 204, can process contents of an e-mail (e.g., data and metadata). N-GRAM ANALYZER 132 can create n-grams from the e-mail content and the n-grams can be analyzed by OWNER TASK IDENTIFIER 128 to determine if the n-grams comprise data that represents one or more tasks. If the e-mail is determined to comprise a task, then the n-grams can be analyzed to determine if the e-mail recipient is identified as the task owner (e.g., a person responsible to complete a task). If the e-mail comprises a task and the recipient is identified as the task owner, then the e-mail can be marked/identified as a task e-mail. For example, 'Bob' sends an e-mail to 'Alice' stating, "Alice, Please provide a summary of project x by the end of day tomorrow. I need a review before meeting with customer y next week. Regards, Bob." In this example OWNER TASK IDENTIFIER 128 via N-GRAM ANALYZER 132 can extract and determine that 'Alice' is both e-mail recipient and addressed by 'Bob' (e.g., task owner) and the e-mail content with 'summary of project x' indicates an action, making the e-mail to 'Alice' a task e-mail. When operation ANALYZE CONTENT 204 completes, processing proceeds toward operation TASK E-MAIL 206.

Operation TASK E-MAIL 206, determines if the e-mail being processed is marked as a task e-mail. If the e-mail is a task e-mail then processing proceeds toward operation DETERMINE RECOMMENDED ACTIONS 208, otherwise, e-mail processing can end.

Operation DETERMINE RECOMMENDED ACTIONS 208, can analyze n-grams comprising task details, from a task e-mail, with an associated history of tasks and/or actions based on predetermined defaults and/or a task/action history (e.g., TASK HISTORY STORE 134). OWNER TASK ORGANIZER 130 can search n-grams to assign relevant/recommended actions to a task related to a task e-mail, augment the recommended actions specific to n-grams of the task e-mail and prioritize the recommended actions to create a collection of recommended actions. Further, n-grams and related analyses related toward the task e-mail can be stored toward TASK HISTORY STORE 134 to build a task/action corpus. When operation DETERMINE RECOMMENDED ACTIONS 208 completes, processing proceeds toward operation OUTPUT RECOMMENDED ACTIONS 210.

Operation OUTPUT RECOMMENDED ACTIONS 210, can output the collection of recommended actions, for a task e-mail, toward a task owner by OWNER TASK ORGANIZER 130 when task owner interacts with a task e-mail (e.g., e-mail opened). OWNER TASK ORGANIZER 130 can receive a collection recommended actions and related recommended actions states (e.g., interaction condition of action) from TASK HISTORY STORE 134. OWNER TASK ORGANIZER 130 can filter higher priority recommended actions and can order/sequence output for display based on a default sort sequence and/or in a sorted prioritized arrangement. For example, when a recommended action has been completed, the completed recommended action can be positioned toward the right of a recommended action bar and visually shaded to reduce attention from the task owner. In another example, a task may suggest that a meeting action be performed a number of days prior to task completion. In this case, a calendaring action can be prioritized and located toward the left of a recommended action bar and/or highlighted to increase attention from the task owner. It should be noted that the output of the recommended action bar can comprise features such as, but not limited to, icons, text, video, animation, pop-up commands, pull-down commands, fly-over text, etc. to assist a task owner in processing recommended actions in context of associated tasks. When operation OUTPUT RECOMMENDED ACTIONS 210 completes, processing proceeds toward operation PERFORM ACTION 212.

In operation PERFORM ACTION 212, OWNER TASK ORGANIZER 130 can monitor task owner interactions with one or more recommended actions and as a recommended action is executed, the state of the affected recommended action can be noted (e.g., action state). For example, a task owner can launch a recommended action to schedule a meeting and once the action is processed, the action state of the recommended action can change from 'incomplete' to 'complete'. If e-mail interaction is complete (e.g., task owner closes the task e-mail) then recommended action state changes can be identified for the task e-mail interactions and processing proceeds toward operation UPDATE RECOMMENDED ACTION STATUS 214. If no action state changes are identified during the task e-mail interactions, then task e-mail processing ends.

In operation UPDATE RECOMMENDED ACTION STATUS 214, OWNER TASK ORGANIZER 130 can store the action states related to one or more recommended actions in TASK HISTORY STORE 134. When operation UPDATE RECOMMENDED ACTION STATUS 214 completes, processing of the task e-mail ends.

Figure 3:
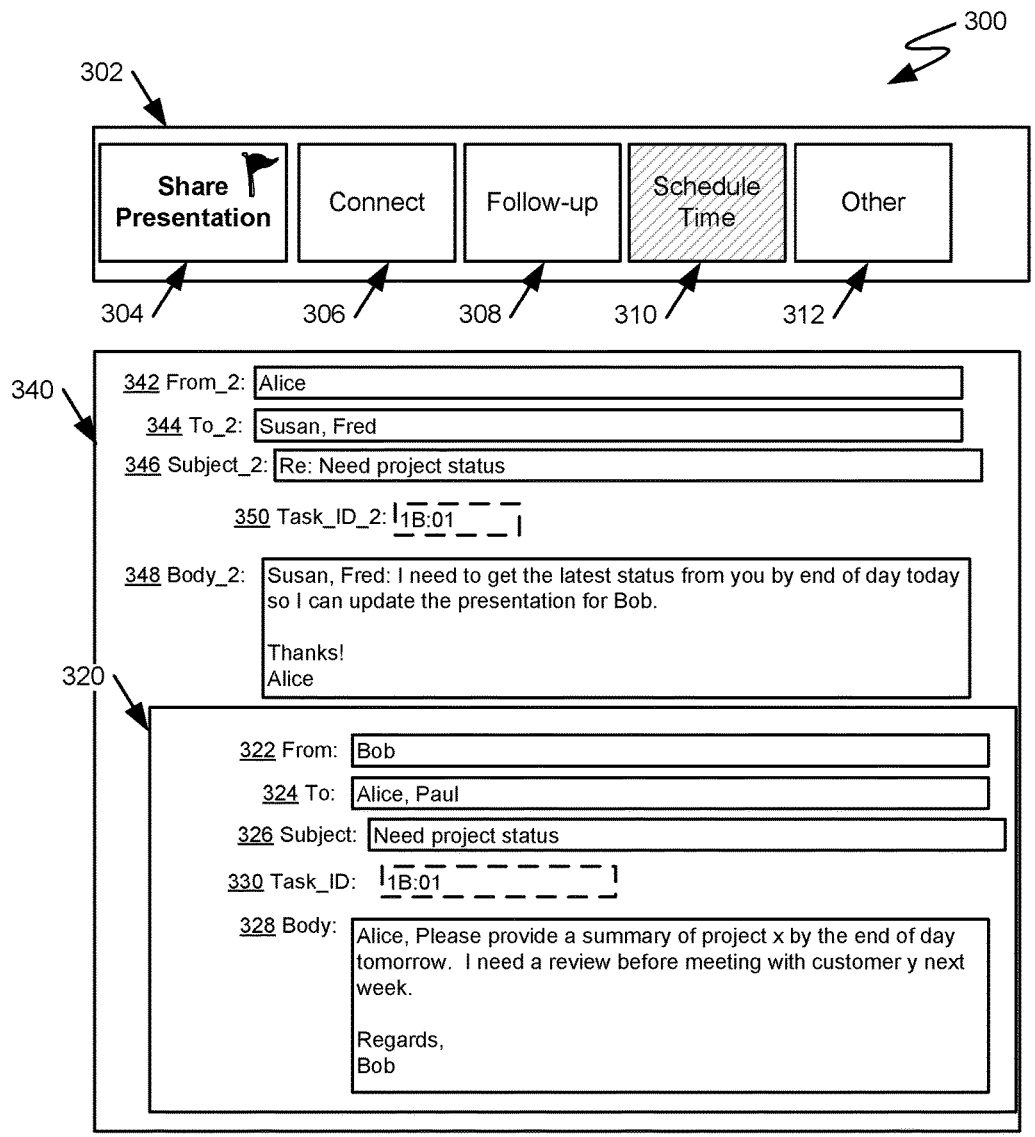
FIG. 3 illustrates a task managed e-mail thread, in accordance with an embodiment of the present invention.

FIG. 3 illustrates a task managed e-mail thread, in accordance with an embodiment of the present invention. The task managed e-mail 300 represents a task e-mail with a recommended action bar and comprises items RECOMMENDED ACTION BAR 302, TASK E-MAIL 320 and TASK E-MAIL RESPONSE 340.

Item TASK E-MAIL 320 illustrates a Task E-Mail that was sent from 'Bob' to 'Alice' to complete a task. Item TASK E-MAIL 320 further comprises tasks FROM 322, TO 324, SUBJECT 326, BODY 328 and TASK_ID 330.

Item FROM 322 illustrates a task e-mail field 'From', comprising 'Bob' who is the requestor of a task. Item TO 324 illustrates a task e-mail field 'To', comprising 'Alice' and 'Paul' and in this example 'Paul' can receive the e-mail that can be determined by OWNER TASK IDENTIFIER 128 to be informational whereas in the e-mail receipt by 'Alice', OWNER TASK IDENTIFIER 128 can identify item TASK E-MAIL 320 as a task e-mail.

Item SUBJECT 326 illustrates a task e-mail field 'Subject' which can contribute n-gram analysis for determining task details.

Item BODY 328 illustrates a task e-mail field 'Body', comprising "Alice, Please provide a summary of project x by the end of day tomorrow. I need a review before meeting with customer y next week. Regards, Bob." OWNER TASK IDENTIFIER 128 can extract field-value pairs via n-grams such as, but not limited to, 1B-SENDER-BOB, 1B-PROJECT-SUMMARY, 1B-PRODUCT-X, 1B-OWNER-ALICE and 1B-DUE-TOMORROW which can be used to determine that 'Alice' is a task owner (e.g., 1B-OWNER-ALICE) for the identified project status task (e.g., 1B-PROJECT-SUMMARY and 1B-PRODUCT-X). OWNER TASK ORGANIZER 130 can further process task details to create a collection of recommended actions (e.g., item RECOMMENDED ACTION BAR 302).

Item TASK_ID 330 illustrates a task e-mail field 'Task_Id' (e.g., Task Identifier) that can associate the task e-mail (e.g., item TASK E-MAIL 320) with item RECOMMENDED ACTION BAR 302 as received from TASK HISTORY STORE 134.

Item TASK E-MAIL RESPONSE 340 illustrates a Task E-Mail Response and further comprises items FROM_2 342, TO_2 344, BODY_2 348 and TASK_ID_2 350.

Item FROM_2 342 illustrates a task e-mail thread field 'From', comprising 'Alice', item TO_2 344 illustrates a task e-mail thread field 'To', comprising both 'Susan' and 'Fred' and item BODY_2 348 illustrates a task e-mail thread field 'Body', comprising "Susan, Fred: I need to get the latest status from you by end of day today so I can update the presentation for Bob. Thanks! Alice." In this example 'Alice' is requesting a task in assisting with her task to create a 'summary of project x' based on item TASK E-MAIL 320. In this case, both 'Susan' and 'Fred' can receive the e-mail from 'Alice' and Item TASK E-MAIL RESPONSE 340, as received by 'Susan' and 'Fred', can be determined by OWNER TASK IDENTIFIER 128, to be task e-mails having their own recommended action bars for 'Susan' and 'Fred' respectively.

Item TASK_ID_2 350 illustrates a task e-mail thread field 'Task_Id' (e.g., Task Identifier) and in this example, comprises similar content as item TASK_ID 330. It should be noted that item RECOMMENDED ACTION BAR 302 can be associated with the task e-mail thread as e-mail exchanges progress, the content, priority and state of item RECOMMENDED ACTION BAR 302 can dynamically change as the task owner (e.g., 'Alice') interacts with recommended actions.

Item RECOMMENDED ACTION BAR 302 illustrates a Recommended Action Bar and further comprises items SHARE PRESENTATION 304, CONNECT 306, FOLLOW-UP 308, SCHEDULE TIME 310 and OTHER 312.

Item SHARE PRESENTATION 304 illustrates a recommended action 'Share Presentation'. In this example 'Share Presentation' is highlighted in bold and comprises a flag icon. The left-most positioning of item SHARE PRESENTATION 304 within item RECOMMENDED ACTION BAR 302, the highlighted recommended action (e.g., bold text) and the superimposed icon can indicate that item SHARE PRESENTATION 304, has not been completed and the recommended action may be urgent (e.g., the task due date is approaching). In this example, item SHARE PRESENTATION 304 can launch a presentation template to create a chart deck specific to 'project x'.

Item CONNECT 306 illustrates a recommended action to 'Connect'. 'Connect' can be a recommended action that can link to a social networking site associated with the customer related to 'project x'. Item CONNECT 306 can be determined as a recommended action based on finding past actions related to 'project x' in TASK HISTORY STORE 134 as OWNER TASK ORGANIZER 130 processed the task e-mail.

Item FOLLOW-UP 308 illustrates a recommended action to create a 'Follow-Up' for the task e-mail (e.g., item TASK E-MAIL RESPONSE 340). In this example, OWNER TASK ORGANIZER 130 may have determined item FOLLOW-UP 308 as a default recommended action and/or was recommended based on the urgency of the task.

Item SCHEDULE TIME 310 illustrates a recommended action to 'Schedule Time' with 'Bob' (e.g., calendar invitation between 'Alice' and 'Bob'). In this example, item SCHEDULE TIME 310 is positioned toward the right within item RECOMMENDED ACTION BAR 302 where item SCHEDULE TIME 310 may have been positioned toward the left within item RECOMMENDED ACTION BAR 302 when item RECOMMENDED ACTION BAR 302 was displayed during task owner interaction with the original task e-mail (e.g., item TASK E-MAIL 320) and prior to item TASK E-MAIL RESPONSE 340. Further, item SCHEDULE TIME 310 is dimmed (e.g., crosshatched) to indicate that item SCHEDULE TIME 310 is complete. In this example, 'Alice' can select item SCHEDULE TIME 310 to open the existing calendar entry where formerly, (e.g., during item TASK E-MAIL 320) item SCHEDULE TIME 310 could have opened a new meeting request form.

Item OTHER 312 illustrates a recommended action 'Other'. Item OTHER 312 can comprise actions such as, but not limited to, lower priority recommended actions, completed recommended actions and recommended tasks that were hidden by a task owner.

Figure 4:
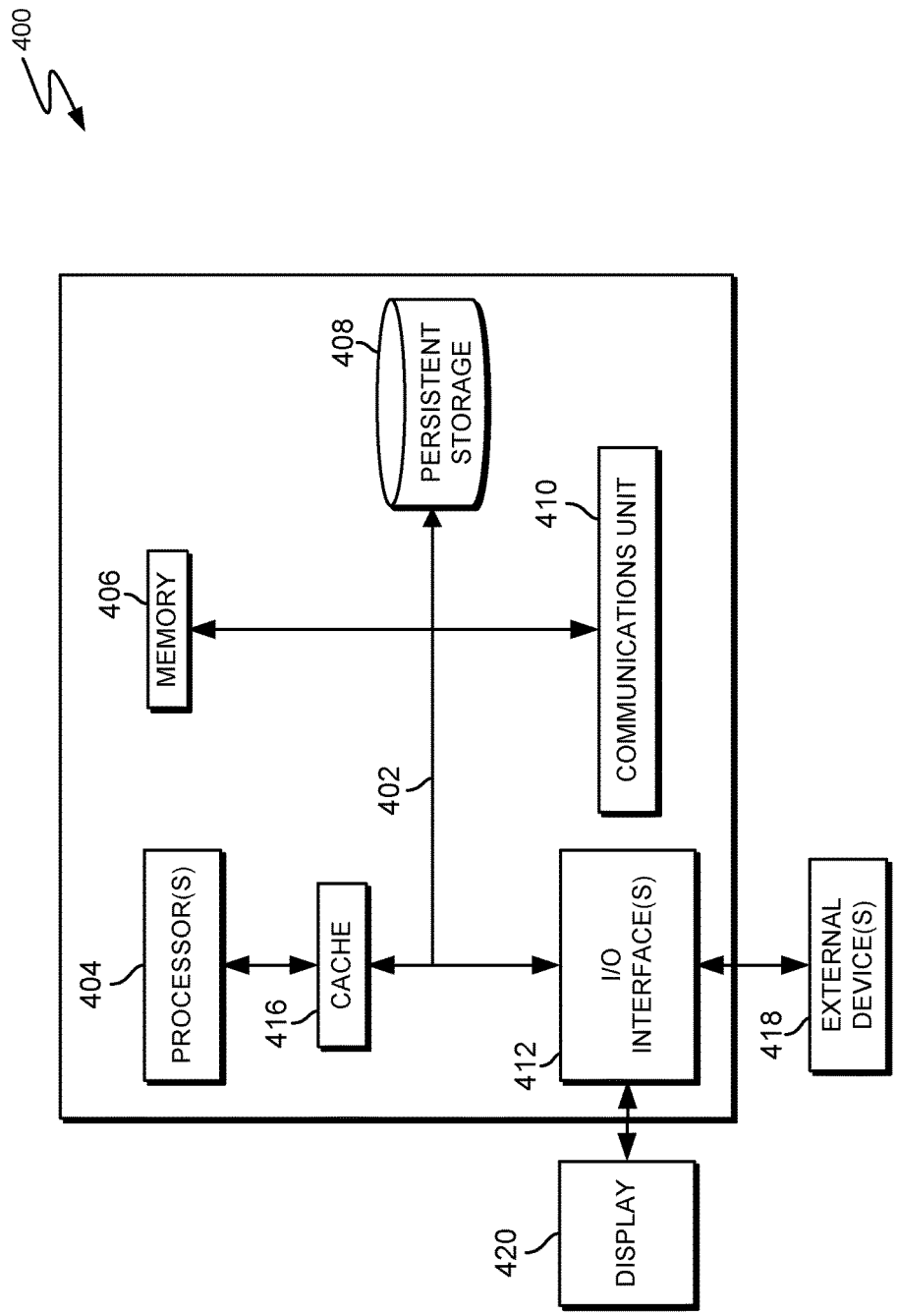
FIG. 4 illustrates a block diagram of components of the server and/or the computing device, in accordance with an embodiment of the present invention.

FIG. 4 illustrates a block diagram of components of COMMUNICATION DEVICE 110 and COMPUTER SYSTEM 120 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computer system 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Computer system 400 includes processors 404, cache 416, memory 406, persistent storage 408, communications unit 410, input/output (I/O) interface(s) 412 and communications fabric 402. Communications fabric 402 provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of processors 404 by holding recently accessed data, and data near recently accessed data, from memory 406.

Program instructions and data used to practice some embodiments may be stored in persistent storage 408 and in memory 406 for execution by one or more of the respective processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program instructions and data used to practice some embodiments may be downloaded to persistent storage 408 through communications unit 410.

I/O interface(s) 412 allows for input and output of data with other devices that may be connected to each computer system. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice some embodiments can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The term "present invention" should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

The term "and/or" should be understood as inclusive or; for example, A, B "and/or" C means that at least one of A, B or C is true and applicable. Further, "at least one of A, B, or C" should be interpreted to mean only A, only B, only C, or any combination of A, B, and C.

What is claimed is:

1. A computer-implemented method for identifying and managing tasks in an e-mail system, the computer-implemented method comprising:
   receiving, by an e-mail task manager, an e-mail;
   creating, by the e-mail task manager, n-grams based on e-mail data content and metadata content associated with the e-mail;
   identifying, by the e-mail task manager, the e-mail as a task e-mail based on analyzing the n-grams to detect a task and a task owner wherein the task owner is a recipient of the e-mail and is identified by the n-grams, wherein the task owner is identified from a list of multiple e-mail recipients;
   determining, by the e-mail task manager, task details associated with the task e-mail based on the n-grams, wherein the n-gram is used to augment recommended actions to operate specifically for a task for each individual task owners within an email thread and to prioritize the recommended actions;
   determining, by the e-mail task manager, a collection of recommended actions based on the task details;
   determining a priority of each of the recommended actions based on the n-grams;
   storing, by the e-mail task manager, the collection of recommended actions and associated action states in a task history store; and
   outputting, by the e-mail task manager, the collection of recommended actions and the action states associated with the task e-mail based on the task owner, wherein the recommended actions are interactive with the task owner, matching a task with a predefined task from the task history store, and outputting the collection of recommended actions comprises:
      dynamically displaying, by the email task manager, a recommended action bar associated with the task email when the task owner opens the task email, wherein the recommended action bar comprises recommended actions, wherein, the recommended actions are sequenced based on the priority of the recommended actions and task owner interactions, wherein the recommended actions are monitored to track conditions of action execution to adjust the priority of the recommended actions and assist the task owner in completing tasks.

2. The computer-implemented method of claim 1, further comprising:
 updating, by the e-mail task manager, the collection of recommend actions and the associated action states based on interactions by the task owner; and
 prioritizing, by the e-mail task manager, one or more recommended actions based on a frequency count result, wherein the frequency count result is determined by comparing the task details to prior task details in the history store.

3. The computer-implemented method of claim 1, wherein the collection of recommended actions is based on matching the task with predefined tasks from the history store.

4. The computer-implemented method of claim 1, wherein the action states comprise at least one of incomplete, complete, in process, hidden, ignore, past due, due or optional.

5. The computer-implemented method of claim 1, wherein outputting the collection of recommended actions is prioritized by sorting recommended actions for display based on at least one of a default sequence, a prioritized task history sequence or a prioritized action history sequence.

6. The computer-implemented method of claim 1, wherein outputting the collection of recommended actions is filtered based on at least one of a predetermined quantity, a display real estate limit or an action state.

7. The computer-implemented method of claim 1, wherein the task details comprise the n-grams associated with identifying the task owner, task deliverables and task due date.

8. A computer program product for identifying and managing tasks in an e-mail system, the computer program product comprising:
 one or more non-transitory computer readable storage media and program instructions stored on the one or more non-transitory computer readable storage media, the program instructions comprising:
  program instructions to, receive, by an e-mail task manager, an e-mail;
  program instructions to, create, by the e-mail task manager, n-grams based on e-mail data content and metadata content associated with the e-mail;
  program instructions to, identify, by the e-mail task manager, the e-mail as a task e-mail based on analyzing the n-grams to detect a task and a task owner wherein the task owner is a recipient of the e-mail and is identified by the n-grams, wherein the task owner is identified from a list of multiple e-mail recipients;
  program instructions to, determine, by the e-mail task manager, task details associated with the task e-mail based on the n-grams, wherein the n-gram is used to augment recommended actions to operate specifically for a task for each individual task owners within an email thread and to prioritize the recommended actions;
  program instructions to, determine, by the e-mail task manager, a collection of recommended actions based on the task details;
  program instructions to, determine a priority of each of the recommended actions based on the n-grams;
  program instructions to, store, by the e-mail task manager, the collection of recommended actions and associated action states in a task history store; and
  program instructions to, output, by the e-mail task manager, the collection of recommended actions and the action states associated with the task e-mail based on the task owner, wherein the recommended actions are interactive with the task owner, matching a task with a predefined task from the task history store, and outputting the collection of recommended actions comprises:
   program instructions to, dynamically display, by the email task manager, a recommended action bar associated with the task email when the task owner opens the task email, wherein the recommended action bar comprises recommended actions, wherein, the recommended actions are sequenced based on the priority of the recommended actions and task owner interactions, wherein the recommended actions are monitored to track conditions of action execution to adjust the priority of the recommended actions and assist the task owner in completing tasks.

9. The computer program product of claim 8, further comprising:
 program instructions to, update, by the e-mail task manager, the collection of recommend actions and the associated action states based on interactions by the task owner; and
 program instructions to, prioritize, by the e-mail task manager, one or more recommended actions based on a frequency count result, wherein the frequency count result is determined by comparing the task details to prior task details in the history store.

10. The computer program product of claim 8, wherein the collection of recommended actions is based on matching the task with predefined tasks from the history store.

11. The computer program product of claim 8, wherein the action states comprise at least one of incomplete, complete, in process, hidden, ignore, past due, due or optional.

12. The computer program product of claim 8, wherein output the collection of recommended actions is prioritized by sorting recommended actions for display based on at least one of a default sequence, a prioritized task history sequence or a prioritized action history sequence.

13. The computer program product of claim 8, wherein output the collection of recommended actions is filtered based on at least one of a predetermined quantity, a display real estate limit or an action state.

14. The computer program product of claim 8, wherein the task details comprise the n-grams associated with identifying the task owner, task deliverables and task due date.

15. A computer system for identifying and managing tasks in an e-mail system, the computer system comprising:
 one or more computer processors;
 one or more non-transitory computer readable storage media;
 program instructions stored on the one or more non-transitory computer readable storage media for execution by at least one of the one or more computer processors, the program instructions comprising:
  program instructions to, receive, by an e-mail task manager, an e-mail;
  program instructions to, create, by the e-mail task manager, n-grams based on e-mail data content and metadata content associated with the e-mail;
  program instructions to, identify, by the e-mail task manager, the e-mail as a task e-mail based on analyzing the n-grams to detect a task and a task owner wherein the task owner is a recipient of the e-mail and is identified by the n-grams, wherein the task owner is identified from a list of multiple e-mail recipients;

program instructions to, determine, by the e-mail task manager, task details associated with the task e-mail based on the n-grams, wherein the n-gram is used to augment recommended actions to operate specifically for a task for each individual task owners within an email thread and to prioritize the recommended actions;

program instructions to, determine, by the e-mail task manager, a collection of recommended actions based on the task details;

program instructions to, determine a priority of each of the recommended actions based on the n-grams;

program instructions to, store, by the e-mail task manager, the collection of recommended actions and associated action states in a task history store; and program instructions to, output, by the e-mail task manager, the collection of recommended actions and the action states associated with the task e-mail based on the task owner, wherein the recommended actions are interactive with the task owner, matching a task with a predefined task from the task history store, and outputting the collection of recommended actions comprises:

program instructions to, dynamically display, by the email task manager, a recommended action bar associated with the task email when the task owner opens the task email, wherein the recommended action bar comprises recommended actions, wherein, the recommended actions are sequenced based on the priority of the recommended actions and task owner interactions, wherein the recommended actions are monitored to track conditions of action execution to adjust the priority of the recommended actions and assist the task owner in completing tasks.

16. The computer system of claim 15, further comprising:
program instructions to, update, by the e-mail task manager, the collection of recommend actions and the associated action states based on interactions by the task owner; and program instructions to, prioritize, by the e-mail task manager, one or more recommended actions based on a frequency count result, wherein the frequency count result is determined by comparing the task details to prior task details in the history store.

17. The computer system of claim 15, wherein the collection of recommended actions is based on matching the task with predefined tasks from the history store.

18. The computer system of claim 15, wherein the action states comprise at least one of incomplete, complete, in process, hidden, ignore, past due, due or optional.

19. The computer system of claim 15, wherein output the collection of recommended actions is prioritized by sorting recommended actions for display based on at least one of a default sequence, a prioritized task history sequence or a prioritized action history sequence.

20. The computer system of claim 15, wherein output the collection of recommended actions is filtered based on at least one of a predetermined quantity, a display real estate limit or an action state.

* * * * *